United States Patent

[11] 3,578,847

[72] Inventor David S. Grey
Lexington, Mass.
[21] Appl. No. 863,562
[22] Filed Oct. 3, 1969
[45] Patented May 18, 1971
[73] Assignee Polaroid Corporation
Cambridge, Mass.
Continuation-in-part of application Ser. No. 687,167, Dec. 1, 1967.

[54] THREE ELEMENT OBJECTIVE LENS
1 Claim, 2 Drawing Figs.
[52] U.S. Cl. .................................................. 350/226, 350/255
[51] Int. Cl. ...................................... G02b 7/04, G02b 9/16
[50] Field of Search .......................................... 350/226

[56] References Cited
UNITED STATES PATENTS

| | | | |
|---|---|---|---|
| 2,279,372 | 4/1942 | Herzberger................ | 350/226 |
| 2,388,869 | 11/1945 | Reiss...................... | 350/226X |
| 2,440,088 | 4/1948 | Grey....................... | 350/212 |
| 2,699,700 | 1/1955 | Klemt...................... | 350/226X |
| 2,728,266 | 12/1955 | Tolle....................... | 350/226X |

*Primary Examiner*—John K. Corbin
*Attorneys*—Brown and Mikulka, William D. Roberson and Frederick H. Brustman ABSTRACT: A telephoto triplet objective lens is disclosed wherein the first element facing the longer conjugate is a positive meniscus lens of relatively high power and thickness. The second element is a negative, biconcave, relatively thick, lens. The third element is a relatively thin biconvex positive lens. Lens elements two and three are made from the same material. This lens is designed to be molded from polymer materials.

PATENTED MAY 18 1971 3,578,847

| | F = 1.00 | | L.O.A. = 0.172 | | F = 9.2 |
|---|---|---|---|---|---|
| LENS | REFRACTION INDEX | ABBÉ VALUE | MATERIAL | RADIUS | THICKNESS & SPACING |
| I | 1.49 | 57 | POLYMETHYL METHACRYLATE | $R_1 = 0.163$<br>$R_2 = 2.946$ | $t_1 = 0.056$<br>$S_1 = 0.017$ |
| II | 1.59 | 31 | POLYSTYRENE | $R_3 = 1.071$<br>$R_4 = 0.150$ | $t_2 = 0.042$<br>$S_2 = 0.037$ |
| III | 1.59 | 31 | POLYSTYRENE | $R_5 = 0.330$<br>$R_6 = 1.993$ | $t_3 = 0.020$<br>$S_3 = 0.783$ |

INVENTOR.
DAVID S. GREY

BY Brown and Mikulka
and
Frederick H. Brustman
ATTORNEYS

THREE ELEMENT OBJECTIVE LENS

This application is a continuation-in-part of my prior copending application Ser. No. 687,167, filed Dec. 1, 1967.

BACKGROUND

This invention is related to lens systems, and more particularly to improved telephoto triplet objectives for use with photographic devices.

Relatively low-priced photographic cameras fabricated through high-volume production techniques have continually enjoyed a wide acceptance by the consumer public. To preserve their low unit cost, these cameras may be configured to have rigid nonfolding housings supporting a simple and inexpensive objective lens a fixed distance from an exposure plane. Where broadened photographic capabilities are desired, particularly those afforded by variable focusing, the rigid housing arrangement is generally discarded in favor of expansible bellows systems or the like. The latter structures while permitting axial translation required for variable focusing are more costly than rigid housings.

SUMMARY

The present invention provides a variable focus objective system amenable to relatively low unit cost production techniques and which is compatible with rigid camera structures having a fixed back focal length. Characterized as an objective triplet, the system advantageously permits front element focusing with minimal axial translation of the front focusing element. A large range of focusing adjustments is possible with relatively small axial translations of the first element through the use of a relatively high power therein. Further, inasmuch as the triplet is telephoto in nature, the lens arrangement of the invention derives a design advantage by allowing camera structures of a reduced size, but without requiring a commensurate reduction in image format.

An important feature of the novel lens system set forth herein is its suitability for fabrication by injection molding techniques. Inasmuch as the individual elements of the lens system are molded in one step to final form, time-consuming grinding and polishing operations normally associated with the production of quality photographic objective lenses are eliminated.

The chromatic aberrations otherwise encountered with the use of a relatively high-power first lens element are compensated through selection of widely different Abbe number values for the optical media of the lens elements of the system. In this regard, a substantial variation in Abbe values exists between the serially disposed first element and the second and third elements of the objective. Suitable longitudinal chromatic corrections are obtained without the use of a cemented doublet in the lightweight objective lens system.

The telephoto triplet lens system is designed to provide progressively smaller clear apertures of its three elements from the longer conjugate to the shorter conjugate. The aperture diaphragm may be positioned between the second and the third elements or following the last element. Placing the maximum aperture in the former position permits it to also be used as a baffle to reduce hot spots at the image plane caused by reflections from the steeply curved surfaces of the first element. When located between the second and third elements, a fixed maximum aperture can be conveniently molded as an integral part of the lens cell. By placing the shutter and smaller apertures to the rear of the last lens element, outside the cell, the entire objective can be fabricated separately from aperture and shutter control devices. A significant flexibility in fabrication techniques may be gained from such structuring. For instance, the modular flexibility of the separate components permits simplified removal and replacement procedures. Should lens defects be encountered during the course of manufacturing inspection, only the lens, as opposed to the entire exposing mechanism, need be removed from the camera for replacement.

The triplet lens objective of the present invention is particularly characterized in comprising, in the direction of light rays through the objective proceeding from the longer conjugate to the shorter conjugate, a single, homogeneous condensing meniscus lens element followed by a biconcave dispersing lens element followed in turn by a condensing lens element having surfaces of unequal curvature.

The intermediately situated biconcave lens is a negative element whose surface facing the longer conjugate is formed having a radius of curvature (compared in absolute value) of larger dimension than the focal length of the objective.

To compensate chromatic aberrations, in part, the rearward condensing lens element is formed from an optical medium having an Abbe value of less than 0.70 of the Abbe value of the first positive meniscus element.

Another feature and object of the invention is to provide a novel photographic objective system having an overall length, i.e., from the first surface vertex to the focal plane, which is less than the focal length of the objective lens system. A further object of the invention is to provide a lightweight triplet lens system adapted for production by molding its individual elements to final form in one operation.

In addition to an advantageously small overall length, the telephoto lens system of the invention is further characterized in developing an image area of greater diameter than the focal length of the system. The latter aspect will be seen as most unique for a triplet objective lens system of a telephoto variety.

Other objects of the invention will, in part, be obvious and will, in part, appear hereinafter.

The invention accordingly comprises a telephoto lens system possessing the features, properties and relation developments which will be exemplified in the detailed disclosure to follow.

DESCRIPTION OF THE DRAWING

For a fuller understanding of the nature and objects of the invention, reference should be had to the following description of the preferred embodiments thereof taken in connection with the accompanying drawing wherein.

DESCRIPTION OF THE LENS

Figures 1, 2:
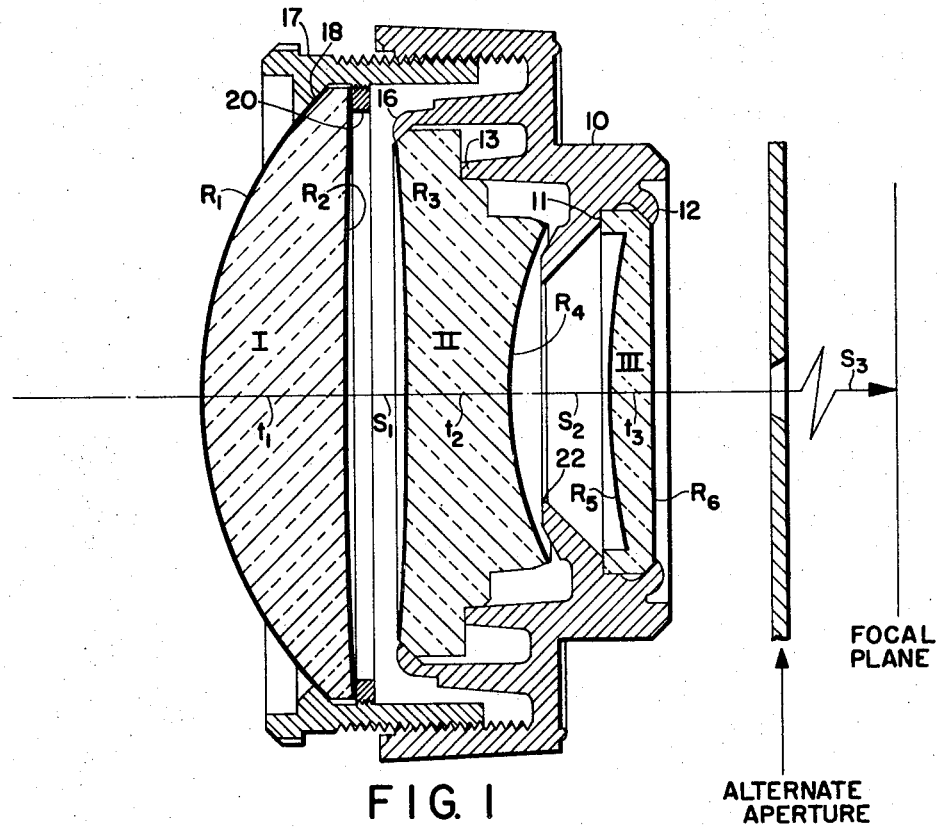
FIG. 1 is an axial sectional view of a mounted triplet objective lens embodying the invention.
FIG. 2 is a compilation of numerical data pertaining to an example of the lens system of the invention.

In FIG. 1, a structure for mounting the three elements of the objective lens system of the invention is portrayed. It will be immediately apparent to those skilled in the art of lens fabrication that such mountings lend themselves to high volume assembly techniques. In the FIG., a lens mounting bracket or cell 10 is pictured supporting lens elements II and III in appropriately spaced axial alignment. Lens element III nests against a step 11 and is secured thereupon by an overlapping lip 12.

In similar fashion, lens element II is positioned against an integral molded seat 13. Element II is secured in position by forward lip 16. Of course, many techniques for attaching these elements will be apparent to those versed in the art.

Threadedly engaged at the integral surface of lens cell 10 is a bezel 17 within which is mounted a positive meniscus element I. Element I is secured in the bezel against a seat 18 by an annular collar 20. Axial translation of element I is effected by rotation of bezel 17. An annular spring member (not shown) can be placed between bezel 17 and cell 10 so that bezel 17 must rotate against its biasing force. The relatively slight forces imposed by such a spring can develop sufficient holding friction between cell 10 and bezel 17 to prevent any play or looseness at their threaded interconnection. The friction causes the retention of the front element in any position to which it is adjusted. A baffle 22 is shown in position between elements II and III. In the preferred embodiment, baffle 22 determines the maximum aperture and also serves to reduce hot spots from the first element. To reduce the f/number of the objective, smaller stops are positioned at the alternate aperture location.

For the purpose of providing a specific example of a telephoto triplet lens objective or lens system as described and illustrated herein, and with references to the lens system or objective shown in the FIGS. of the drawing, the following tabulation sets forth physical values applicable to FIG. 2 and related lens arrangements based, for convenience, upon a focal length, F, equal to unity.

EXAMPLE A

| F = 1.00 | | | L.O.A. = 0.172 | | f = 9.2 |
|---|---|---|---|---|---|
| Lens | Refractive Index | Abbé Value | Material | Radius | Thickness & Spacing |
| I | 1.49 | 57 | Polymethyl Methacrylate | $R_1 = 0.163$<br>$R_2 = 2.946$ | $t_1 = 0.056$<br>$S_1 = 0.017$ |
| II | 1.59 | 31 | Polystyrene | $R_3 = -1.071$<br>$R_4 = 0.150$ | $t_2 = 0.042$<br>$S_2 = 0.037$ |
| III | 1.59 | 31 | Polystyrene | $R_5 = 0.330$<br>$R_6 = -1.993$ | $t_3 = 0.020$<br>$S_3 = 0.783$ |

In the above tabulation, the lens elements are indicated by Roman numerals; R indicates the radii of the lens surfaces; t indicates the thickness of the elements measured along the optical axis; and S indicates the air space between the elements measured along the optical axis. The column "Refractive Index" of the table refers to the refractive indices of the optical media of the elements as measured for the, yellow, hellium "d" line. The column "Abbe number" refers to the value of each lens. The relative aperture of the lens is "f" and the distance from the first to the last surface is L.O.A. (Length Overall). Air space $S_1$ is variable for focusing purposes. The value given is for a front conjugate of infinity. Back focal length, the distance between the focal plane and the sixth lens surface is listed as $S_3$. Also listed is a material having the desired optical properties for the particular lens element and which is suitable for injection molding.

Methyl methacrylate in its polymerized form is preferred for use as the optical media of the first element due to its comparatively large Abbe number. Polymerized styrene is used to make the second and third elements. The third element has an Abbe number value less than 0.70 of the first elements. Designing the lens so the necessary optical properties for each element is available in a polymer material permits these elements to be produced in their final, polished form, using injection molding. Thusly fabricated, the system readily lends itself to low cost production techniques while preserving adequate optical quality. Its lightness contributes to the portability of a finished camera.

As indicated earlier, in order to minimize the axial translation of the front positive meniscus lens, element I, while still providing for adequate variable focus, element I is configured having relatively high power. This power relationship may be evidenced from a comparison of the varying thicknesses, t, of the elements in the system. In order to compensate for chromatic aberration otherwise resulting from the use of a singular, homogeneous and relatively high power element I, the Abbe number of element III is selected to be less than 0.70 of the Abbe number of lens element I, i.e., $$\frac{v\text{III}}{v\text{I}} < 0.70.$$

Under this criterion it will be apparent that the shape of lens element III may vary somewhat from that indicated in the example.

The intermediate lens element II is seen from the tabulation to be a negative lens whose front radius of curvature $R_3$ is (in absolute value) greater than the focal length.

The tabulation of Example A shows the total objective thickness to be 17.2 percent of the focal length. Also, the distance from the last surface of the objective, $R_6$, to the focal plane is shown to be 78.3 percent of the focal length. Summing these lengths, the overall length of Example A is 95.5 percent of the focal length. Example A is a telephoto lens. All embodiments of the lens system exhibit this telephoto property.

The lens system is also found to have acceptable image quality throughout an area having a diameter of value greater than its focal length. A satisfactory magnitude of the petzval sum is achieved without excessive curvature of the lens elements.

Since certain changes may be made in the above objective lens system without departing from the scope of the invention herein involved, it is intended that all matter contained in the above description or shown in the accompanying drawing shall be interpreted as illustrative and not in a limiting sense.

I claim:

1. A front element focusing, axially aligned, three element, air spaced, telephoto objective lens system with a useful image area whose diameter is at least equal to its focal length, having the following characteristics related to a focal length, F, equal to unity:

| F = 1.00 | | | | f = 9.2 | |
|---|---|---|---|---|---|
| Lens Element | Refractive Index Nd | Abbé Value | Material | Surface Radii | Thickness & Spacing |
| I | 1.49 | 57 | Polymerized Methyl Methacrylate | $R_1 = 0.163$<br>$R_2 = 2.946$ | $t_1 = 0.056$<br>$S_1 = 0.017$ |
| II | 1.59 | 31 | Polymerized Styrene | $R_3 = -1.071$<br>$R_4 = 0.150$ | $t_2 = 0.042$<br>$S_2 = 0.037$ |
| III | 1.59 | 31 | Polymerized Styrene | $R_5 = 0.330$<br>$R_6 = -1.993$ | $t_3 = 0.020$<br>$S_3 = 0.783$ | wherein the lens elements are identified by Roman numerals in order from front to rear; $R_1$, $R_2$, ... represent the radii of the refractive surfaces from front to rear; $S_1$ is a variable air space, the value given being for an object at infinity; and $S_3$ is the distance from the last surface to the image plane.